United States Patent [19]
Schubert

[11] 4,205,118
[45] May 27, 1980

[54] HONEYCOMB-LIKE PANEL STRUCTURE AND A METHOD FOR MANUFACTURING SAME

[75] Inventor: Gernot Schubert, Munich, Fed. Rep. of Germany

[73] Assignee: Steigerwald Strahltechnik GmbH, Munich, Fed. Rep. of Germany

[21] Appl. No.: 964,896

[22] Filed: Nov. 30, 1978

[30] Foreign Application Priority Data

Dec. 8, 1977 [DE] Fed. Rep. of Germany ....... 2754776

[51] Int. Cl.² ............................ B23P 3/22; B32B 3/12
[52] U.S. Cl. .................... 428/594; 219/78.11; 219/78.12; 219/121 EB; 428/593
[58] Field of Search ............................ 428/593, 594; 219/78.11, 78.12, 121 EB

[56] References Cited
U.S. PATENT DOCUMENTS

| | | | |
|---|---|---|---|
| 2,108,795 | 2/1938 | Budd | 428/594 |
| 2,820,136 | 1/1958 | Bestes | 219/78.12 |
| 3,748,432 | 7/1973 | Bosworth et al. | 219/121 EB |
| 3,981,689 | 9/1976 | Trelease | 428/603 |

*Primary Examiner*—Brooks H. Hunt
*Attorney, Agent, or Firm*—Kinzer, Plyer, Dorn & McEachran

[57] ABSTRACT

An assembly is formed of thin sheet metal panels, one being of undulating construction, the panels engaging each other in multiple line contact along the apexes of the undulations and the undulations affording a multiplicity of small channels extending through the assembly; the panels are then welded together by a corpuscular beam, preferably an electron beam, that effectively scans a frontal surface of the assembly, the beam being directed essentially parallel to the channels so that weld joints are formed only immediately adjacent the frontal surface.

9 Claims, 4 Drawing Figures

HONEYCOMB-LIKE PANEL STRUCTURE AND A METHOD FOR MANUFACTURING SAME

BACKGROUND OF THE INVENTION

The present invention relates to a honeycomb-like structure consisting of a panel, particularly a metal panel, having a multiplicity of locally separated points of contact, with the large sides or principal surfaces of the panel adhering against each other. Moreover, the invention relates to a method for the manufacture of such a honeycomb structure.

Honeycomb-like panel formations of the above-described kind may consist of an assembly of alternating planar and undulated panels, or of spirally coiled windings of such panels. Moreover, coarser honeycomb structures are known consisting of undulated panels which are staggered from one undulated panel to the next one by half a period and which contact each other at the apex ranges of the undulations.

One problem in the fabrication of such honeycomb-like structures consists of so interconnecting or fixing the individual panels or panel windings in relation to each other so that the formation in question has the required structural consistency and the required mechanical stability. With spirally coiled honeycomb structures of the above-mentioned kind, it is known to accomplish the fixation by a rivet-like fastening member extending transversely across the coil. However, this considerably disturbs the coil structure; its permeability for gases and the like is reduced and the appearance is adversely affected.

Moreover, it is known from German Pat. No. 1,192,624 to coat panels intended for such a coil with a soldering paste and to solder it by heating after the formation of the coil. This is relatively complicated and costly, and in addition there is danger of the coil warping during the heating.

SUMMARY OF THE INVENTION

Accordingly, the present invention is based on the problem of providing a honeycomb-like structure, stable in form, which is so fixed structurally that neither its appearance nor its functional efficiency will be adversely affected. Moreover, the invention is intended to encompass a method for the fabrication of such a honeycomb-like structure which can be executed simply and rapidly.

According to the invention, these problems are solved by a honeycomb-like structure in which the contact areas are joined by electron beam welding at a frontal surface, bisecting the lateral surfaces of the panel, which extends transversely to the apertures or channels of the honeycomb structure.

According to the invention, the method for the manufacture of such a honeycomb-like panel formation is characterized by the fact that the panel or panels forming the honeycomb-like structure are welded, at contact areas where the principal surfaces of the panels abut the frontal surface or frontal surfaces, by a focused corpuscular beam which is directed against the frontal surface with such an orientation that it extends substantially parallel with the large lateral surfaces and longitudinally of the honeycomb channels.

The connecting of the panels at the frontal surfaces assures a firm consistency of the panel formation and a high structural stability. The welded joints can be produced easily and rapidly by a corpuscular radiation, particularly an electron beam, without having to fear any appreciable warping or deformation of the structure. The open structure of the honeycomb formation is preserved.

Embodiments of the invention are described in greater detail below with reference to the drawings, in which.

Figure 1:
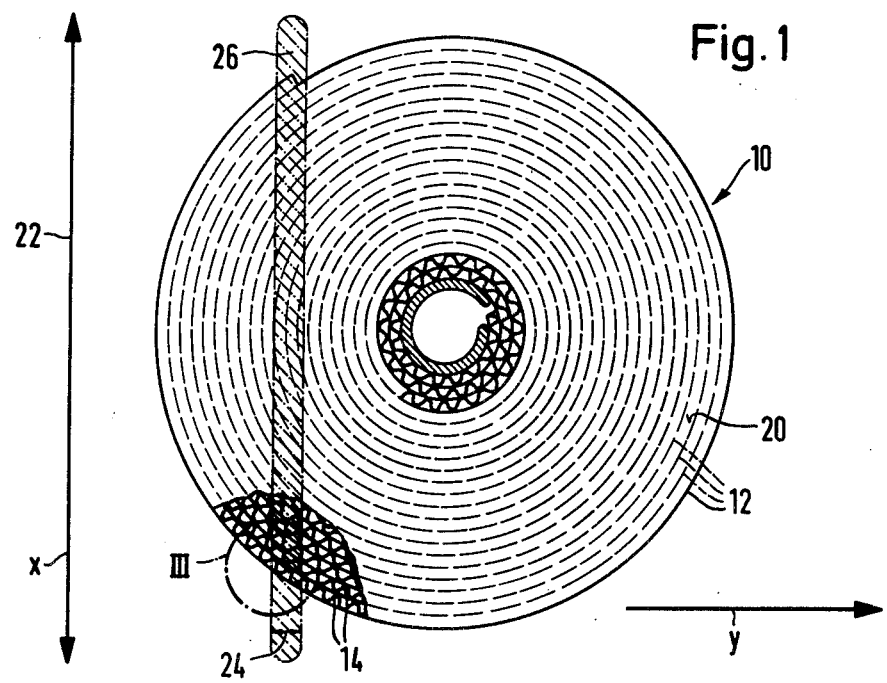
FIG. 1 is an end or frontal view of a honeycomb-like coil formation during manufacture, with local weldments being formed according to one embodiment of the method of the invention.
Figure 3:
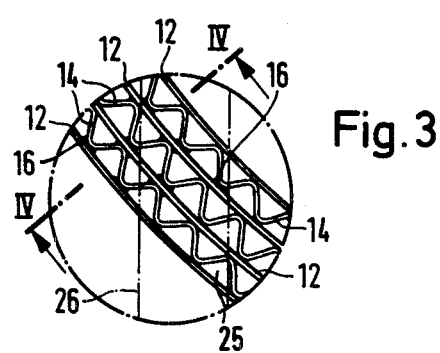
FIG. 3 is a detail view, on an enlarged scale, of part of the honeycomb formation, as indicated by the phantom circle III in FIG. 1.
Figure 4:
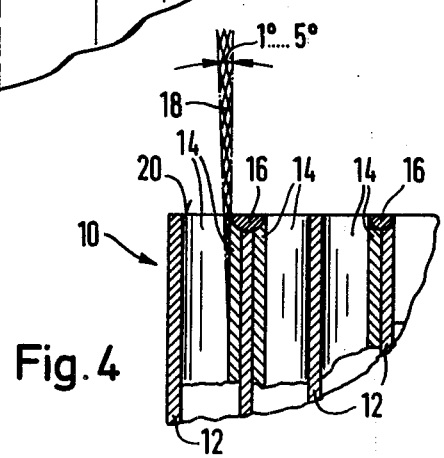
FIG. 4 is a detail sectional view taken approximately alone line IV—IV in FIG. 3.

The honeycomb-shaped structure 10, shown in FIG. 1 in an end or frontal view, is a coil in the form of a straight circular cylinder consisting of spirally adhering coils of a smooth sheet of metal strip 12, and of an undulated sheet metal strip 14, adhering to each other. The sheet metal strips contact each other at the apex points of the undulations of the undulated sheet metal strip 14. As shown more precisely in FIGS. 3 and 4, according to the invention, strips 12 and 14 are interconnected at these locally separated areas of contact 16 by local weld joints. The honeycomb-like structure 10 has, as a result of the multiple contact areas at the frontal surfaces, an excellent structural stability; on the other hand, neither its appearance nor its permeability are adversely affected by the localized, narrowly limited weld joints 16.

The many weld joints at locally separated contact points 16 are produced, according to another essential characteristic of the present invention, by means of a corpuscular beam 18, for example an ion beam, but preferably by an electron beam which is directed against the frontal surface 20 of the honeycomb structure so that it extends essentially parallel to the large principal surfaces of the sheet metal strips 12 and 14. Electron beam welding machines are generally known; see for example U.S. Pat. No. 2,987,610.

Figure 2:
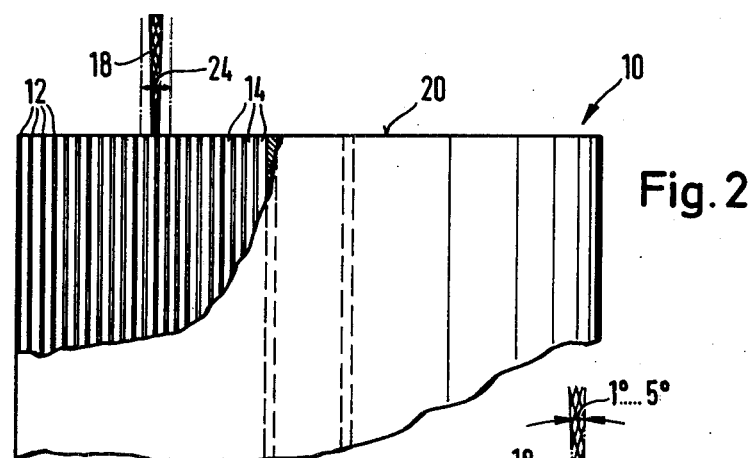
FIG. 2 is an elevation view, partly cut away, of the honeycomb formation of FIG. 1.

In the production of the welding joints at the locally separated contact areas 16, the corpuscular beam 18 may be deflected in a first direction x (FIG. 1) periodically transversely over the frontal or end surface of structure 10, while at the same time the blank assembly, that is the assembly of sheets that is to form the completed honeycomb-like formation, is moved in a second direction y, by a mechanical feeding system, transversely to the line 22 scanned by the corpuscular beam in the x direction. The feed in the y direction also may be replaced by a corresponding slow beam deflection in this direction. The deflection in the x direction can be accomplished at a relatively low frequency, for example 10 to 50 cycles, particularly of 30 cycles. Moreover, a small, higher-frequency deflection (24) (FIG. 2) may be superposed, in the y direction, over the periodic deflection in the x direction. The frequency of this low amplitude deflection 24 may amount, for example, to several hundred or thousand cycles, specifically for example four kilocycles. The deflection amplitude in the x direction is a function of the diameter (or other overall dimension) of the structure 10 and may amount, for example, to 90 mm. The higher frequency deflection 24 in the y direction may have an amplitude of 2 mm, for example. A linearly focused sheet-like beam also may be used in place of the x deflection. Thus, the beam extends substantially parallel with the longitudinal direction of the apertures or channels 25 of the honeycomb-like structure, which are parallel to each other.

A narrowly focussed electron beam 18 is used for the bonding of the contact areas 16. For example, beam 18 may have an aperture of only a few degrees of angle. The focus of the beam preferably is located in or proximate to the frontal surface 20 (see FIG. 4).

For the bonding of a honeycomb-like coil of the kind demonstrated in FIG. 1, from steel panels 12, 14 having thicknesses of about 50 to 100 micrometers, it is possible to operate, for example, with the above mentioned deflection frequencies and amplitudes, with an operating distance between the discharge end of the beam gun and the frontal surface 20 of about 440 mm, an electron beam with a beam voltage of 130 kilovolts, and a beam current of about 22 milliamperes, or also with a beam voltage of 60 KV, a beam current of 50 mA and a working distance of 300 to 500 mm. These values are presently preferred examples; however, they may be selected differently depending on the geometry of the elements of structure 10 and the operating conditions. The feeding speed y may amount, for example, to 30 mm/second.

The radiation energy is selected, as a function of the panel thickness, the focusing condition and the deflection frequencies and amplitudes, so that the material of the honeycomb structure in fact melts at the local contact areas 16 adjacent to the frontal surface 20 inpinged by the beam, but not where the beam projects into the interstices or channels between the panels and contacts the panels in a glancing manner. With the described scanning incidence the energy of the beam is in fact distributed over the larger panel surfaces, so that the beam will deliver considerably more energy to the panels in the contact areas 16 where a localization of heat is produced, causing a melting of the sheet metal and the desired welded connection at the contact areas 16. Stopping the beam at the individual points of contact 16, therefore, is not necessary. Due to the fine honeycomb structures of thin panels, it would also be very difficult in practice, due to the stratified uncertainty (irregularity of spacing) of the contact areas.

On the other hand, under the method according to the invention, as a result of the beam deflection along line 22 and/or the beam influence surface generated by the x/y deflection, each contact area to be bonded is seized and bonded independently of its precise position. As a function of the matrix form of the honeycomb-like structure 10, including the panel thickness and the melting depth, it is possible to produce under the present method several thousands of weld joints per second. The high energy density of the energy beam operates during a very short time, but still acts uniformly on all welding points of the structure, independently of the relative position between the structure and the beam gun. The localization of heat at each contact area 16 which is produced during the actually short sojourn time of the beam in the contact area causes the contact areas to be bonded, without, however, adversely affecting the geometric shape of the matrix of the honeycomb-like formation. The welding result is homogeneous from welding point (contact area) to welding point and can be reproduced in an excellent fashion. Because the lateral surfaces are impinged by the beam only in a scanning fashion, they will not sustain any damage due to the energy density which thereby is low.

The honeycomb structure described above can be used in an exhaust system of an internal combustion engine, e.g. a motor of an automobile, as an insert in a muffler and/or as support for a catalyst used for reducing pollution.

I claim:

1. A honeycomb-like structure comprising a plurality of layers each including two sheet metal panels, at least one of the panels in each layer being of undulating configuration and the panels engaging each other along multiple line contacts at the apexes of the undulations, affording a multiplicity of small channels extending through the structure parallel to the undulations of the one panel, characterized by the fact that the panels are joined together at a frontal surface, transverse to the channels, by a multiplicity of localized beam-welded joints limited to the contact portions of the panels immediately adjacent the frontal surface.

2. A honeycomb-like structure according to claim 1, further characterized in that the structure is formed by one smooth sheet metal panel coiled together with one undulating sheet metal panel.

3. The method for the fabrication of a honeycomb-like structure from a plurality of sheet metal panels having large lateral surfaces which contact each other at a multiplicity of points and form a multiplicity of channels extending in a predetermined direction, characterized by the fact that the panels are bonded at limited contact point areas which abut a frontal surface extending transversely to the holes, by a focused corpuscular beam which is directed with such orientation toward the frontal surface that it substantially extends essentially longitudinally of the channels.

4. The method as defined in claim 3, characterized by using an electron beam as corpuscular beam.

5. The method as defined in claim 3 or claim 4, characterized by the fact that the corpuscular beam is deflected in a first direction transversely over the frontal surface and that in a second direction, transverse to the first direction, a relative movement is generated between the frontal surface and the corpuscular beam.

6. The method as defined in claim 5, characterized by the fact that the corpuscular beam is scanned periodically, with an amplitude that is low in relation to the amplitude of the first deflection, transversely to the direction of the first deflection.

7. The method as defined in claim 6, characterized by the fact that the scanning frequency is larger by at least one order of magnitude than the frequency of the deflection of the corpuscular beam in the first direction.

8. The method as defined in claim 3 or claim 4, characterized by the fact that the frontal surface is scanned with a sheet-like corpuscular beam.

9. The method as defined in claim 3 or claim 4, characterized by the fact that the density of energy of the corpuscular beam in the area of the frontal surface is selected, as a function of the velocity of the relative movement between the corpuscular beam and the honeycomb-like structure in such a manner that the material of the panels is welded by the corpuscular beam at the contact areas immediately adjacent the frontal surface, but is not welded along the lateral surfaces of the panels.

* * * * *